(12) United States Patent
File et al.

(10) Patent No.: US 12,007,123 B2
(45) Date of Patent: Jun. 11, 2024

(54) SYSTEM FOR CONTROLLING THERMAL EXPANSION IN A TUBE HEATER

(71) Applicant: Superior Radiant Products Ltd., Stoney Creek (CA)

(72) Inventors: Gjergji File, Oakville (CA); Aleksandar Tepsic, Beamsville (CA); Kevin Merritt, Burlington (CA)

(73) Assignee: SUPERIOR RADIANT PRODUCTS LTD., Stoney Creek (CA)

( * ) Notice: Subject to any disclaimer, the term of this patent is extended or adjusted under 35 U.S.C. 154(b) by 440 days.

(21) Appl. No.: 17/305,365

(22) Filed: Jul. 6, 2021

(65) Prior Publication Data
US 2022/0010975 A1 Jan. 13, 2022

Related U.S. Application Data

(60) Provisional application No. 63/048,876, filed on Jul. 7, 2020.

(51) Int. Cl.
*F24D 19/02* (2006.01)
*F24D 5/08* (2006.01)
*F24D 19/06* (2006.01)

(52) U.S. Cl.
CPC .......... *F24D 19/0209* (2013.01); *F24D 5/08* (2013.01); *F24D 19/023* (2013.01); *F24D 19/0259* (2013.01); *F24D 19/062* (2013.01)

(58) Field of Classification Search
CPC ............... F24D 19/0209; F24D 19/023; F24D 19/0259; F24D 19/062; F24D 5/08
USPC ........................................................ 126/91 A
See application file for complete search history.

(56) References Cited

U.S. PATENT DOCUMENTS

| | | | | |
|---|---|---|---|---|
| 3,307,529 | A | * | 3/1967 | Fannon, Jr. ............. F23C 99/00 431/89 |
| 9,303,880 | B1 | * | 4/2016 | Tomlinson ............ F23D 14/125 |
| 2007/0012312 | A1 | * | 1/2007 | Hayden ................. F24S 30/425 126/600 |
| 2009/0180232 | A1 | * | 7/2009 | Brice ........................ F24D 5/08 126/91 A |
| 2011/0120453 | A1 | * | 5/2011 | Wunning ................ F23C 3/002 126/91 A |

* cited by examiner

*Primary Examiner* — Avinash A Savani
(74) *Attorney, Agent, or Firm* — Westman, Champlin & Koehler, P.A.

(57) ABSTRACT

There is provided a system for securing a tube heater to a structure, the tube heater having a burner and a radiant tube extending to an exhaust outlet. The system includes an elongate canopy with an exhaust end securable to the exhaust outlet, an opposed burner end securable adjacent to the burner, and a reflector extending there between. An exhaust hanger is rigidly coupled to the structure and to the canopy proximate the exhaust end, and rigidly receives the exhaust outlet. A burner hanger is coupled to the canopy proximate the burner end and is slidably coupled to the structure. The burner hanger receives the radiant tube therethrough. The burner hanger allows the burner and burner end of the canopy to slide relative to the structure to accommodate thermal expansion of the radiant tube and the canopy from the exhaust end towards the burner end.

17 Claims, 17 Drawing Sheets

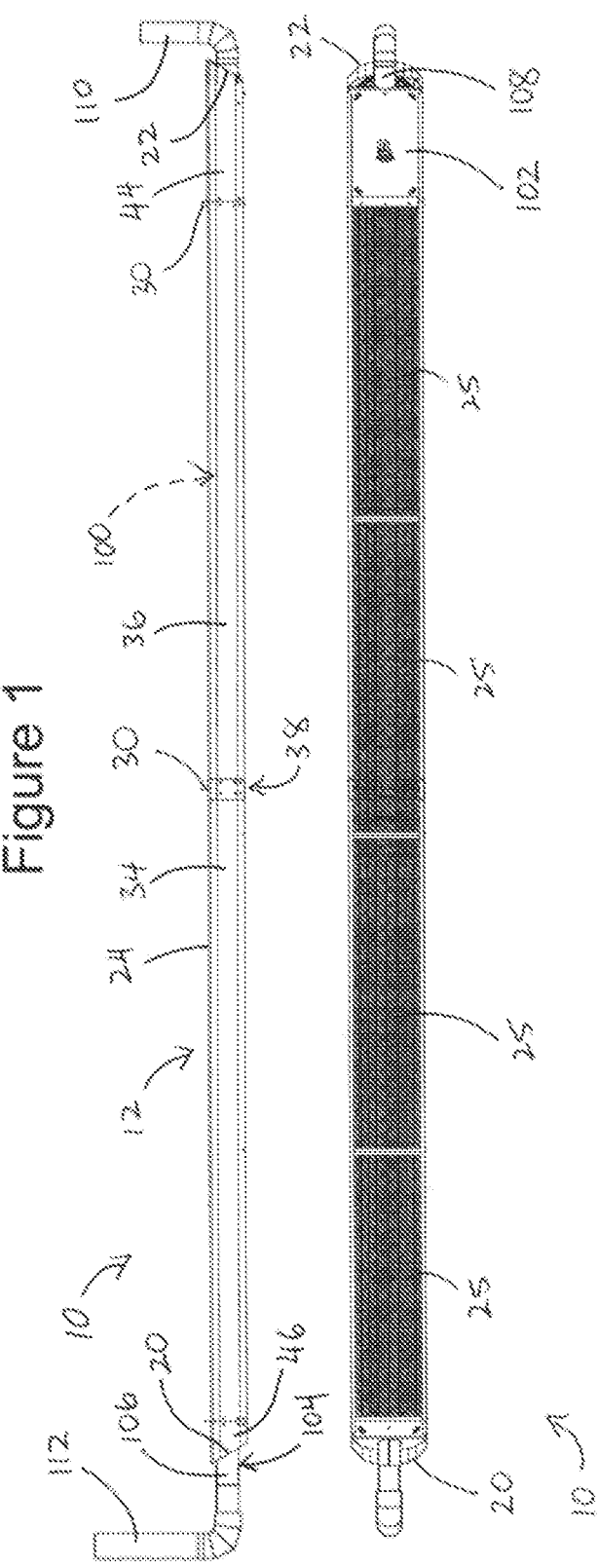

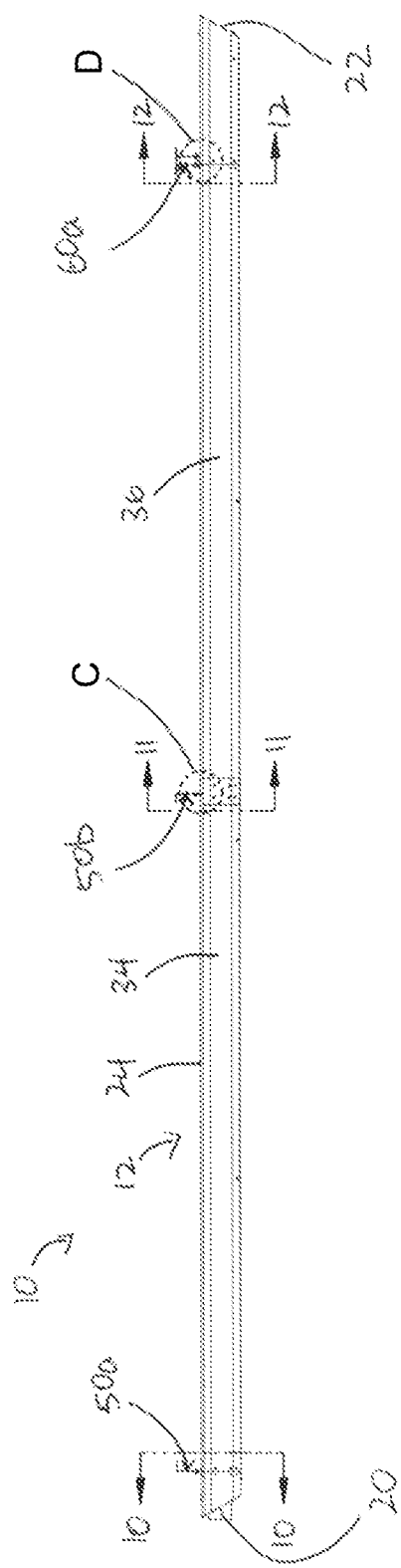

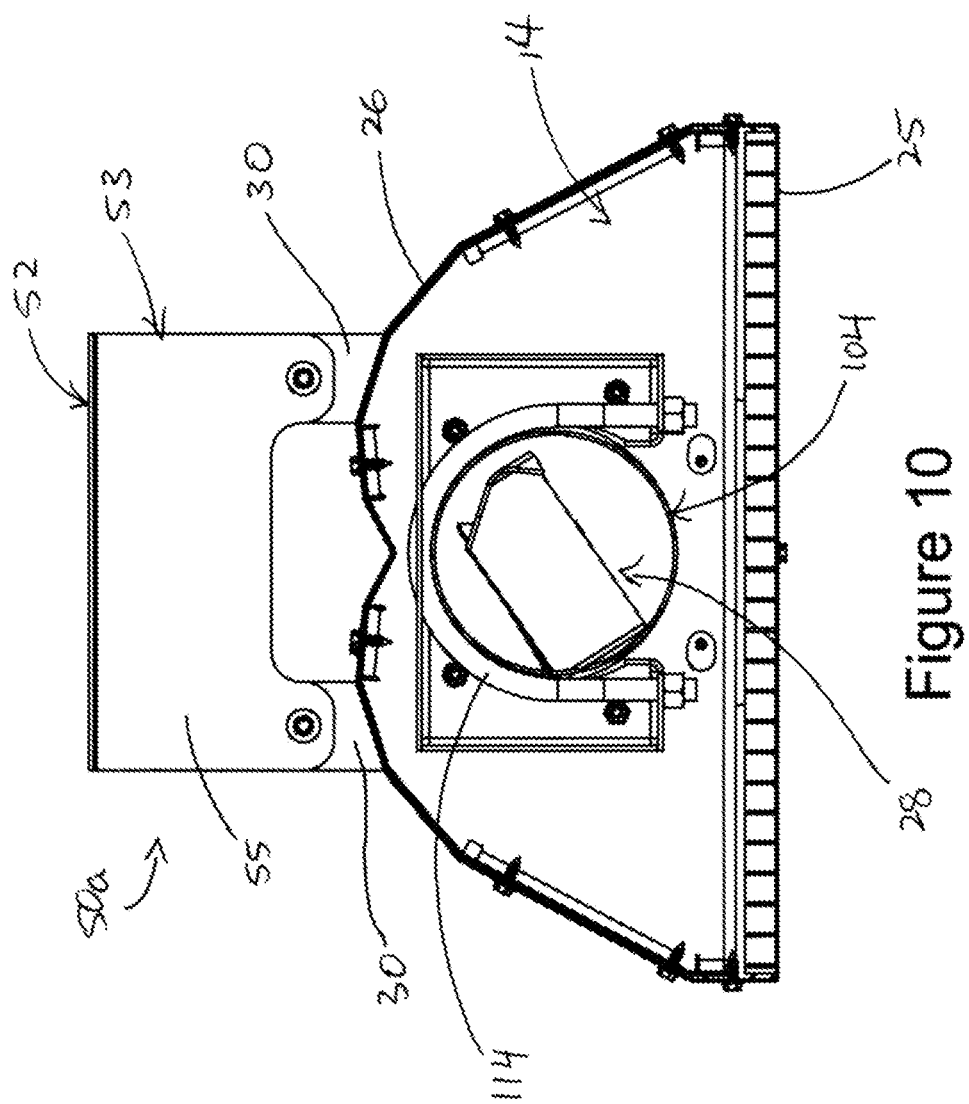

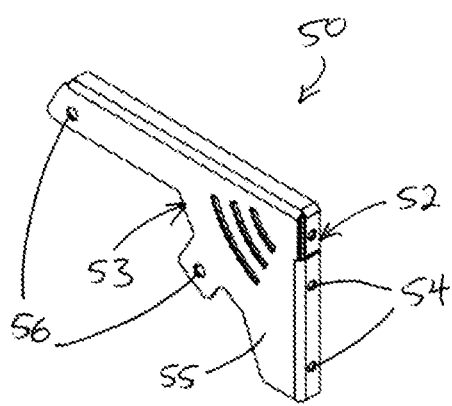
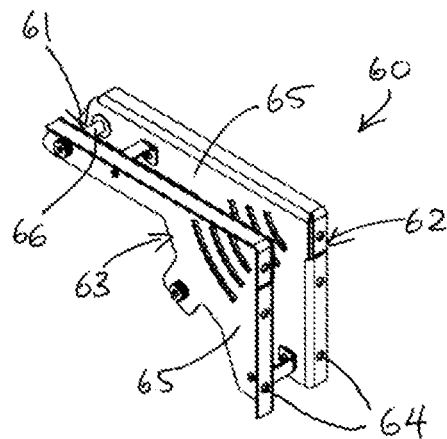
Figure 13　　　　　　　Figure 14
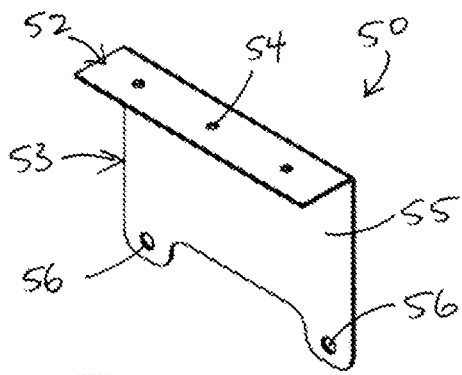
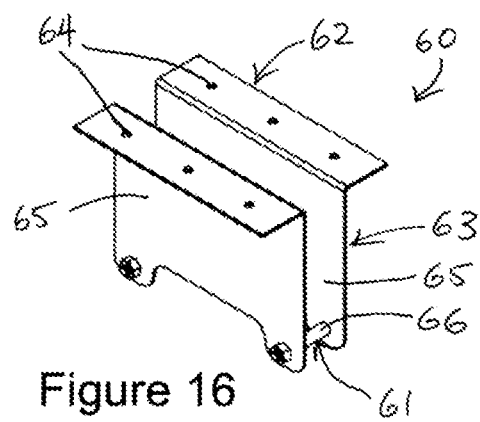
Figure 15　　　　　　　Figure 16
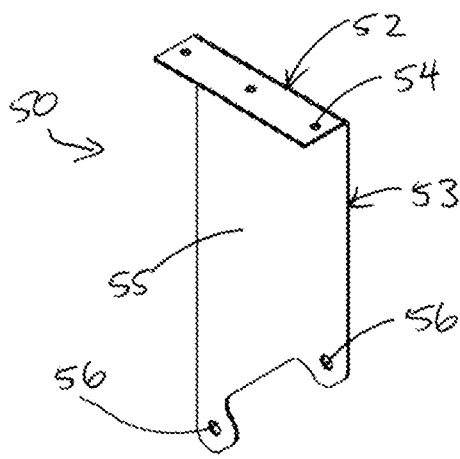
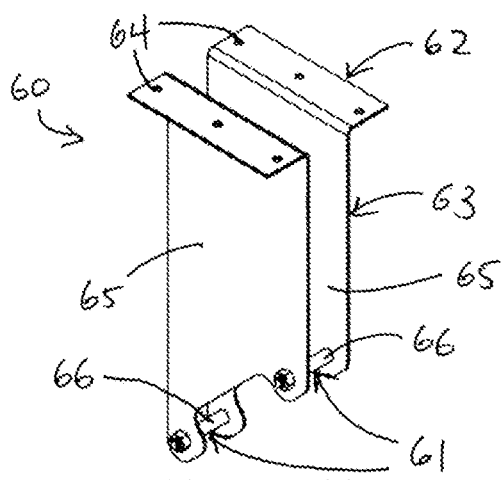
Figure 17　　　　　　　Figure 18

SYSTEM FOR CONTROLLING THERMAL EXPANSION IN A TUBE HEATER

FIELD

This invention relates generally to radiant heating systems and, in particular, to an apparatus and a system to help manage thermal expansion in a tube heater.

BACKGROUND

Tube fired radiant energy heating systems are frequently used in residential, industrial, and commercial buildings with frequent air changes. In such applications, radiant energy heating systems are often regarded as superior to forced air systems from the stand points of comfort provided to occupants and of fuel savings. Tube fired radiant heaters radiate heat which is typically reflected downward towards the floor by reflectors, thereby heating the floor, objects and occupants. Tube fired radiant heaters also take advantage of the re-radiation and the natural convection of heat from the interior of the building.

Tube fired radiant heating systems normally include a burner mounted at the inlet end of an emitter tube, which radiates heat along its length to an exhaust end, where the combustion products are vented into the atmosphere.

As with most materials, however, emitter tubes and their reflectors are subject to thermal expansion when they are heated. Such expansion can cause buckling, stress, and strain, particularly between emitter tubes and their reflectors. The reflector is often made of a different material than the emitter tube, meaning that the two components thermally expand and contract at different rates. The components often also have different surface areas, thus they will expand and contract to differing degrees.

It is desirable to have a radiant heater system that can be securely mounted to a building while also taking into account the varying thermal expansion of its components. The residential applications are more sensitive to the aesthetics of the hanging systems and required design consideration.

SUMMARY

In one aspect the invention there is provided a system for securing a tube heater with a longitudinal axis to a structure, the tube heater having a burner with a radiant tube extending therefrom to an exhaust outlet, the system comprising an elongate canopy coupled to the tube heater and extending along the longitudinal axis, the canopy comprising a reflector extending between the exhaust outlet and the burner and having an exhaust end securable to the tube heater adjacent the exhaust outlet, and an opposed burner end securable adjacent to the burner; an exhaust hanger rigidly coupled to the canopy proximate the exhaust end and configured to be rigidly coupled to the structure, the exhaust hanger rigidly couple to the exhaust outlet of the tube heater to hang the exhaust outlet and the exhaust end from the structure; and a burner hanger coupled to the canopy proximate the burner end and configured to be slidably coupled to the structure, the burner hanger configured to secure the radiant tube at a position adjacent to the burner, the burner hanger hanging the burner end and the radiant tube that is adjacent to the burner from the structure; wherein the burner hanger allows the radiant tube adjacent to the burner and the burner end of the canopy to slide relative to the structure, and permits the radiant tube adjacent to the burner to slide relative to the burner end of the canopy, to accommodate independent thermal expansion of the radiant tube and the canopy from the exhaust end toward the burner end and to accommodate independent thermal contraction of the radiant tube and the canopy from the burner end toward the exhaust end.

In another aspect of the invention there is provided a system for securing a tube heater having a longitudinal axis to a structure, the tube heater having a burner and a radiant tube extending therefrom to an exhaust outlet, the heat expansion system comprising: an elongate canopy coupled to the tube heater and extending along the longitudinal axis, the canopy comprising a reflector extending between the exhaust outlet and the burner and having an exhaust end securable to the tube heater adjacent the exhaust outlet, and an opposed burner end securable to the tube heater adjacent to the burner; an exhaust hanger rigidly coupled to the canopy proximate the exhaust end and rigidly coupled to the structure, the exhaust hanger rigidly coupled to the exhaust outlet of the tube heater; and a burner hanger coupled to the canopy proximate the burner end and slidably coupled to the structure, the burner hanger configured to receive and slidably secure the radiant tube therethrough, at a position adjacent to the burner; wherein the burner hanger allows the radiant tube adjacent to the burner and the burner end of the canopy to slide relative to the structure, and allows the radiant tube adjacent to the burner to slide through the burner hanger relative to the canopy, to accommodate independent thermal expansion of the radiant tube and the canopy from the exhaust end toward the burner end and to accommodate independent thermal contraction of the radiant tube and the canopy from the burner end toward the exhaust end.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 1 is a side elevational view of a system with a tube heater in accordance with an embodiment of the present invention.

FIG. 2 is a bottom elevational view of the system of FIG. 1.

FIG. 7 is a side elevational view of the system of claim 1 in use with fixed and free brackets.

FIG. 10 is an enlarged, cross-sectional view along line 10-10 of FIG. 7.

FIG. 13 is a side perspective view of a fixed wall bracket in isolation.

FIG. 14 is a side perspective view of a free wall bracket in isolation.

FIG. 15 is a side perspective view of a fixed ceiling bracket in isolation.

FIG. 16 is a side perspective view of a free ceiling bracket in isolation.

FIG. 17 is a side perspective view of another fixed ceiling bracket in isolation.

FIG. 18 is a side perspective view of another free ceiling bracket in isolation.

DESCRIPTION

Figure 3:
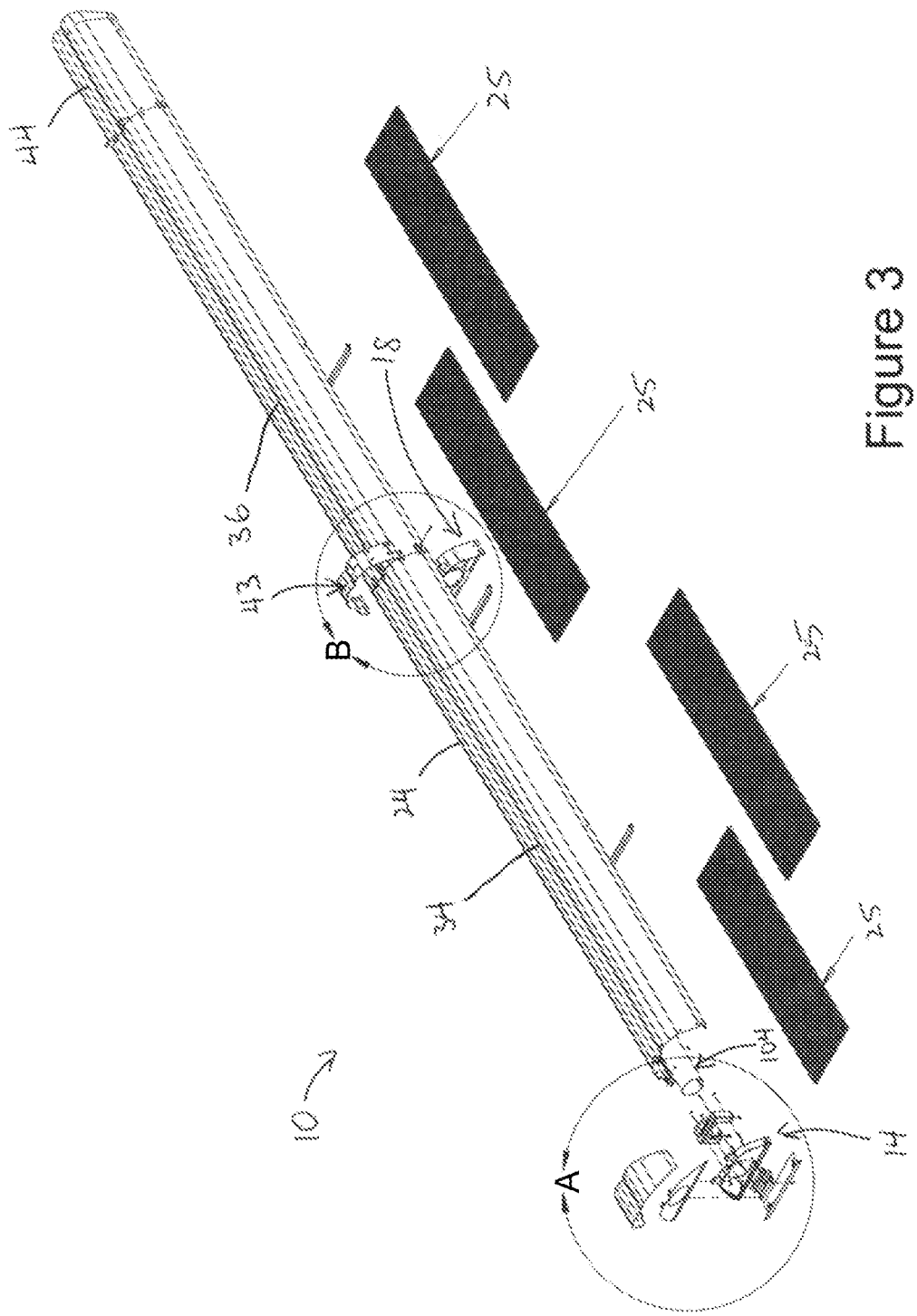
FIG. 3 is an exploded top perspective view of the system of FIG. 1.
Figure 4:
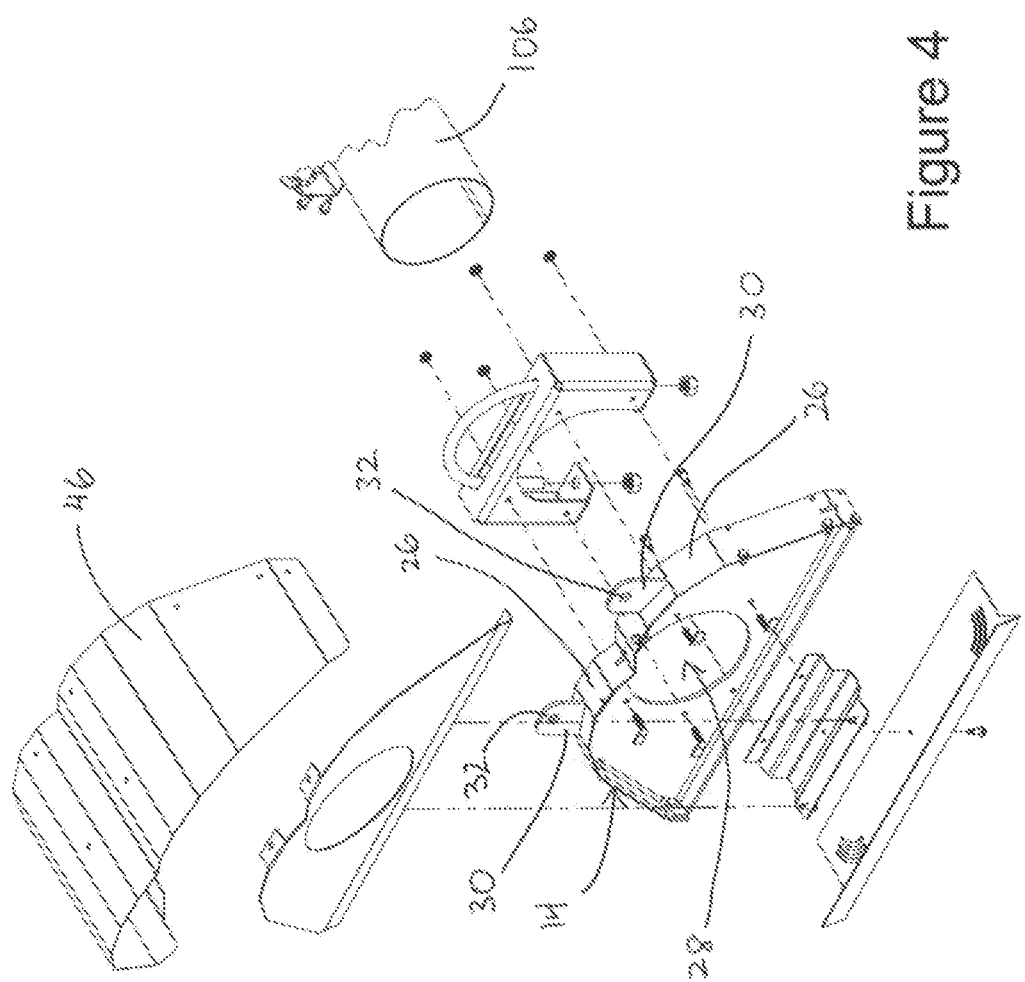
FIG. 4 is an enlarged view of portion A of FIG. 3.
Figure 5:
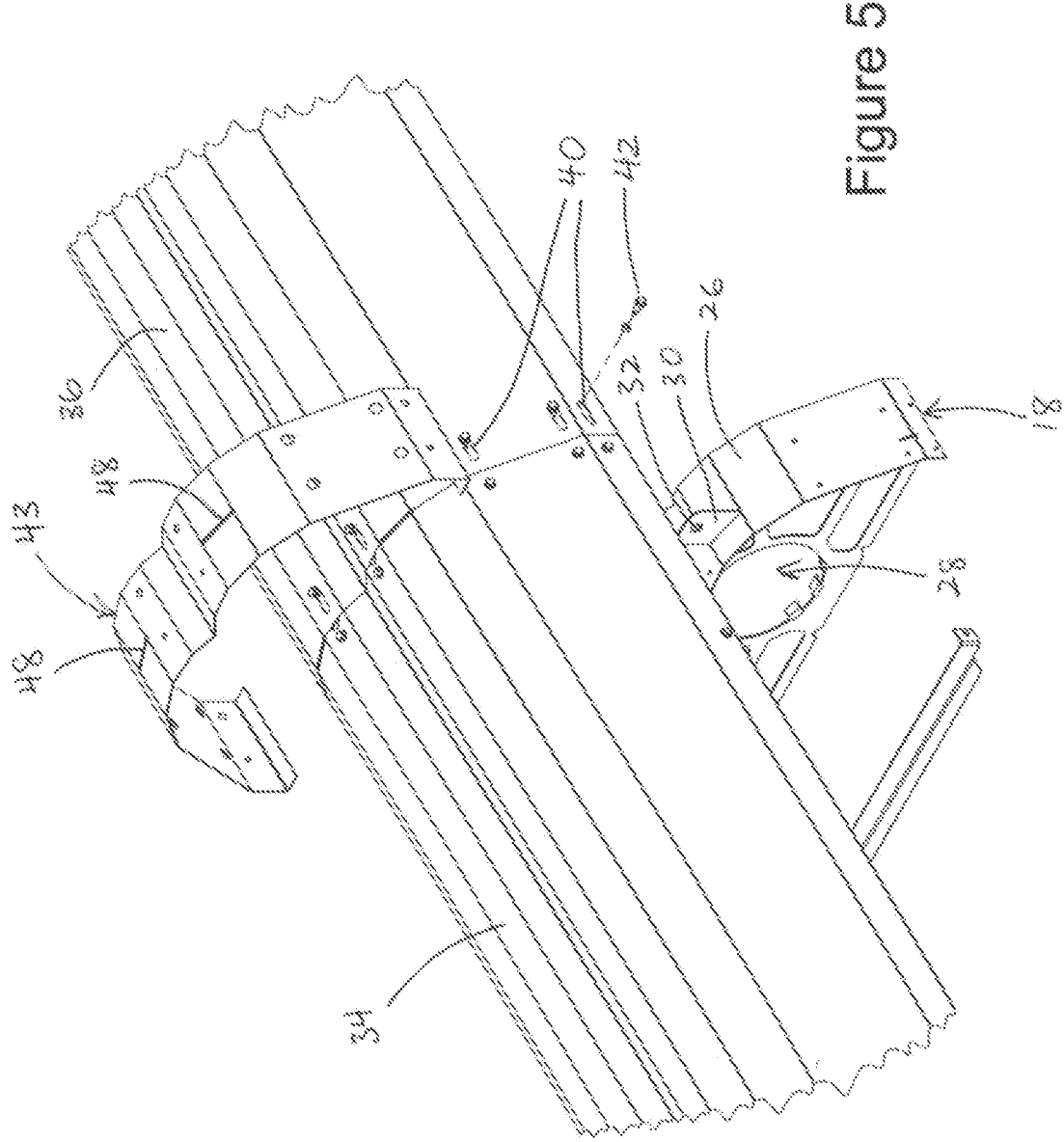
FIG. 5 is an enlarged view of portion B of FIG. 3.
Figure 6:
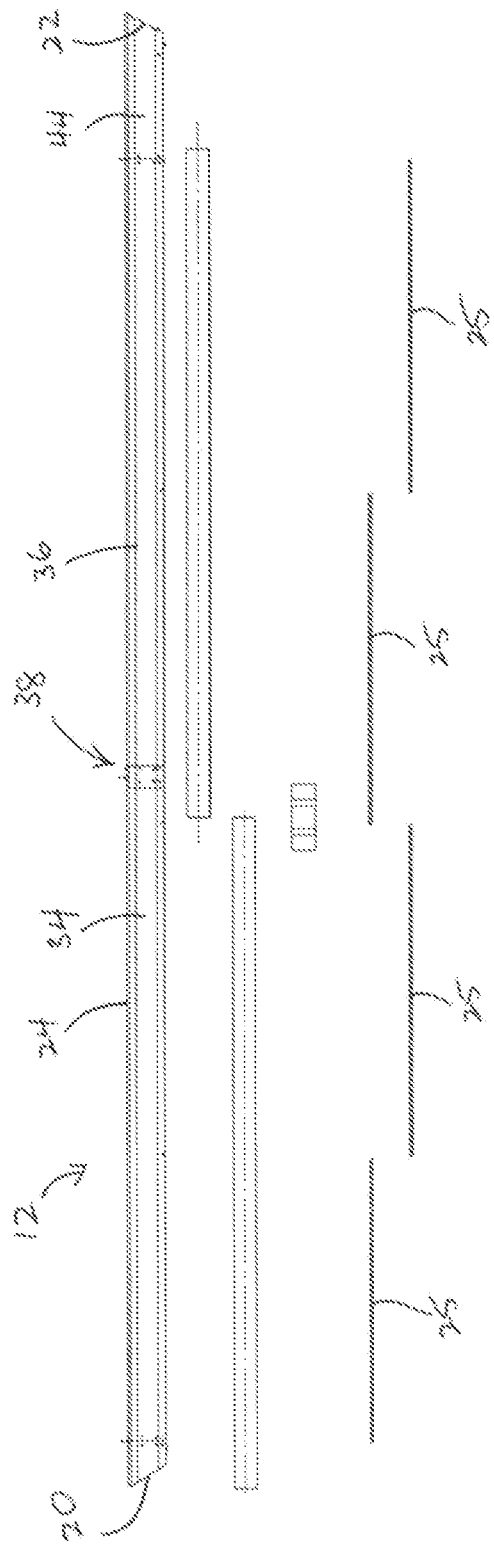
FIG. 6 is an exploded side elevational view of FIG. 3

The present invention may be embodied in a number of different forms. The specification and drawings that follow describe and disclose some of the specific forms of the invention.

There is described herein a system 10 for securing a tube heater 100 to a structure 200. Tube heater 100 generally has a linear configuration with a longitudinal axis X. Tube heater 100 includes a burner 102 with a linear radiant tube 104 extending therefrom, ending in an exhaust outlet 106.

Typically, burner 102 has an intake end 108, which may involve a linear section of flexible duct, typically less than a foot long, to allow movement of the burner, from which intake air is drawn through an air duct 110 from outside structure 200. As discussed further below, intake end 108 helps keep air duct 110 free from movement and rigidly secured to structure 200. If and when air is drawn from inside the room, the intake end 108 is not required.

Exhaust outlet 106 is typically rigidly coupled to exhaust piping 112, which directs and vents exhaust gas outside of structure 200. Both exhaust outlet 106 and exhaust piping 112 are commonly rigidly secured to structure 200.

In FIGS. 1-6, there is illustrated a system 10 according to an example embodiment in use with tube heater 100. System 10 generally comprises an elongate canopy 12, exhaust hanger 14, and a burner hanger 16. In the depicted embodiment, system 10 further includes a middle hanger 18.

Elongate canopy 12 is coupled to tube heater 100 in a covering relationship along longitudinal axis X, with canopy 12 having an exhaust end 20 that is securable to exhaust outlet 106 of tube heater 100, and an opposed burner end 22 that is securable adjacent to burner 102 of tube heater 100. A reflector 24 extends between exhaust end 22 and burner end 24.

Exhaust hanger 14 is coupled to canopy 12 proximate exhaust end 20 and is configured to be rigidly coupled to structure 200. Exhaust hanger 14 is further adapted to rigidly receive and secure exhaust outlet 106 of tube heater 100 therethrough. Thus, in use, exhaust hanger 14 is rigidly coupled to structure 200.

Burner hanger 16 is coupled to canopy 12 proximate burner end 22 and is configured to be slidably coupled to structure 200. Burner hanger 16 is further configured to receive and secure radiant tube 104 adjacent burner 102 therethrough. Thus, in use, burner hanger 16 is slidably coupled to structure 200.

The slidable nature of burner hanger 16 relative to structure 200 allows burner 102 and burner end 22 of canopy 12, which are coupled to burner hanger 16, to slide relative to structure 200 to accommodate thermal expansion of radiant tube 104 and canopy 12. Since exhaust end 20 of canopy 12 is rigidly coupled to structure 200, when radiant tube 104 and canopy 12 thermally expand, their "direction" of expansion is away from exhaust end 20 towards burner end 22 of canopy 12. Similarly, their "direction" of contraction is from burner end 22 to exhaust end 20.

For example, if radiant tube 104 and reflector 24 were to thermally expand such that their lengths increased by approximately one inch, since exhaust outlet 106 and exhaust end 20 are rigidly coupled to structure 200, tube heater 100 and reflector 24 would both extend in the burner direction. The burner hanger 16 may then slide away from exhaust outlet 106 relative to structure 200 to accommodate the expansion of radiant tube 104 and reflector 24.

Optionally, radiant grills 25 may be secured to the underside of reflector 24 in order to obscure tube heater 100 from below.

In the present embodiment, exhaust hanger 14 and burner hanger 16 each comprises shoulders 26 on which reflector 24 rests, a tube opening 28 dimensioned to receive radiant tube 104 therethrough, and two tabs 30 extending from shoulders 26, each having a hanger aperture 32 situated therein.

As best seen in the enlarged figures, shoulders 26 are shaped to correspond with the cross-sectional shape of canopy 12. In this manner, canopy 12 may be secured to shoulders 26 with fasteners, such as screws or bolts. Canopy 12 may alternately be secured to shoulders 26 through a snap fit arrangement.

Figure 12:
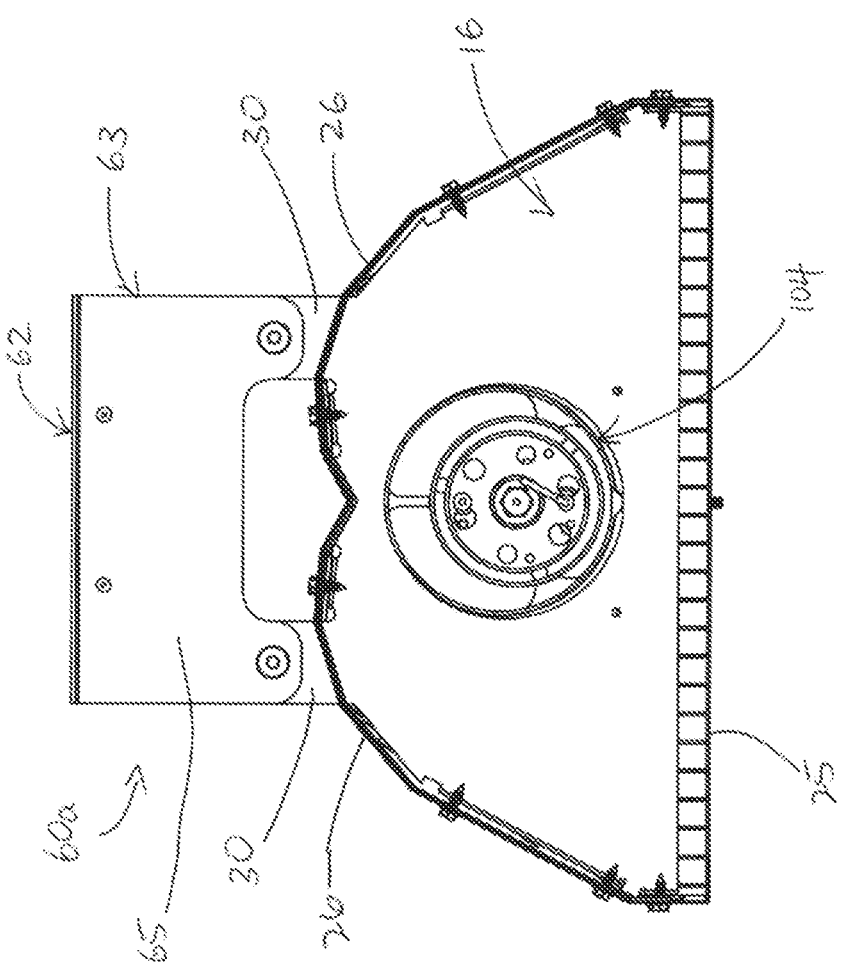
FIG. 12 is an enlarged, cross-sectional view along line 12-12 of FIG. 7.

Since all components must be rigidly coupled together at exhaust end 20, tube opening 28 of exhaust hanger 14 rigidly receives radiant tube 104 therethrough and is secured to radiant tube 104. For example, in FIG. 10 for example. Tube opening 28 of burner hanger 16 receives radiant tube 104 therethrough and may also be secured to radiant tube 104. In the depicted embodiment, tube opening 28 of burner hanger 16, instead, slidably receives radiant tube 104 therethrough, see FIG. 12 for example. Radiant tube 104 is fixed to exhaust hanger 14 by U-bolt 114.

Tabs 30 of exhaust hanger 14 and burner hanger 16 extend past or through reflector 24 such that hanger apertures 32 are positioned above reflector 24. In this manner, tabs 30 may be rigidly or slidably coupled to structure 200. While tabs 30 are shown in the present embodiment, exhaust hanger 14 and burner hanger 16 may have alternate components that extend past reflector 24 for securing to structure 200. As well, while exhaust hanger 14 and burner hanger 16 each are shown to have two tabs 30, in alternate applications, exhaust hanger 14 and burner hanger 16 may instead have a single tab 30 or more than two tabs.

To help accommodate the variable thermal expansion between components of tube heater 100, where tube heater 100 is of significant length, reflector 24 may comprise a first portion 34 and a second portion 36 that is slidably coupled to first portion 34. In this manner, should radiant tube 104 expand or contract to a greater degree than reflector 24, first portion 34 and second portion 36 may slide relative to one.

For example, if radiant tube 104 were to expand at a higher rate than reflector 24 such that radiant tube 104 is longer than reflector 24, first portion 34 may slide away from second portion 36 to help reduce the stretching force that may otherwise be applied to reflector 24.

Where reflector 24 is comprised of first and second portions 34, 36, reflector 24 may further include a sliding joint 38 positioned between exhaust end 20 and burner end 22. Sliding joint 38 slidably couples first portion 34 to second portion 36. In particular, sliding joint 38 may comprise one or more oblong apertures 40 in second portion 36, and one or more fasteners 42 extending through first portion 34 and respective oblong apertures 40 of second portion 36. Alternately, oblong apertures 40 may be positioned in first portion 34, and fasteners 42 may extend through second portion 36 and respective oblong apertures 40 of first portion 34. In either case, a segment of second portion 36 overlaps first portion 34 to allow for linear sliding engagement with first portion 34.

A cover plate 43 may optionally be used to cover sliding joint 38 in reflector 24 to cover oblong apertures 40 and fasteners 42 to make sliding joint 38 more aesthetically pleasing.

In other applications, first portion 34 may be slidably coupled to second portion 36 by alternate means. For example, rather than oblong apertures and fasteners, first portion 34 may be shaped with a sliding track and second portion 36 may be shaped with a corresponding track that slidably receives the track of the first portion 34. In another example, first portion 34 may be in a sliding, telescoping relationship with second portion 36.

Reflector 24 may comprise a third portion 44 extending from the distal end of second portion 36 in covering relation to burner 102, and a fourth portion 46 extending from the distal end of first portion 34 in covering relation to exhaust outlet 106. With abutting ends of third portion 44 and second portion 36 secured to shoulders 26 of burner hanger 16, tabs 30 of burner hanger 16 may extend through the gap or slot between second portion 36 and third portion 44 of reflector 24. In a similar fashion, with abutting ends of fourth portion 46 and first portion 34 secured to shoulders 26 of exhaust hanger 14, tabs 30 of exhaust hanger 14 may extend through the gap or slot between first portion 34 and fourth portion 46 of reflector 24.

In alternate applications, second portion 36 and third portion 44 may be of unitary construction with slits correspondingly sized and positioned therein so as to receive tabs 30 of burner hanger 16 therethrough. In like manner, first portion 34 and fourth portion 46 may be of unitary construction with slits correspondingly positioned therein so as to receive tabs 30 of exhaust hanger 14 therethrough.

The depicted embodiment further includes middle hanger 18 coupled to canopy 12 between burner end 22 and exhaust end 24. Similar to exhaust hanger 14 and burner hanger 16, middle hanger 18 is configured to be coupled to structure 200. However, in use, middle hanger 18 may be rigidly or slidably coupled to structure 200.

Figure 11:
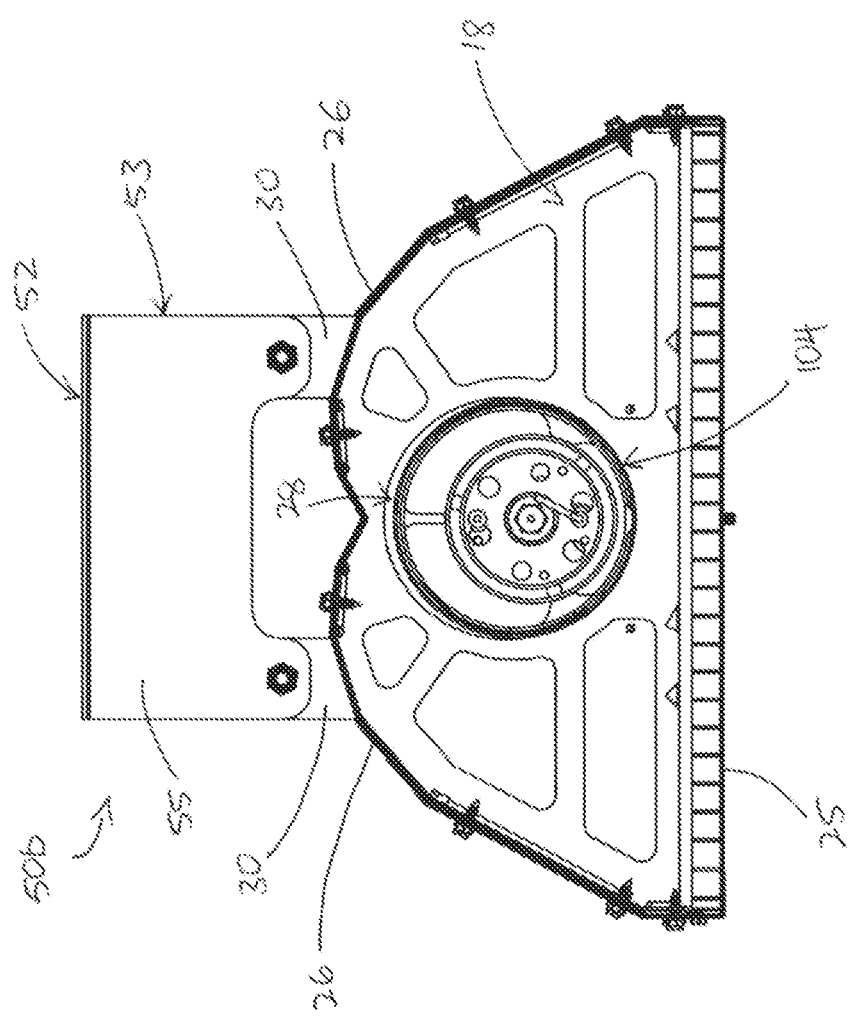
FIG. 11 is an enlarged, cross-sectional view along line 11-11 of FIG. 7.

Also similar to exhaust hanger 14 and burner hanger 16, middle hanger 18 comprises shoulders 26 on which reflector 24 rests and is secured, a tube opening 28 dimensioned to receive radiant tube 104 therethrough, and two tabs 30 extending from shoulders 26, each with a hanger aperture 32 situated therein. However, tube opening 28 of middle hanger 18 is dimensioned and configured to slidably receive radiant tube 104 therethrough, such that at middle hanger 18 tube 104 may slide relative to reflector 24 (see FIG. 11 for example).

The depicted embodiment further illustrates that first portion 34 of reflector 24 extends between exhaust hanger 14 and middle hanger 18, and second portion 36 extends between middle hanger 18 and burner hanger 16. Sliding joint 38 of reflector 24 is shown positioned proximate middle hanger 18. In this way, middle hanger 18 may provide structural support to sliding joint 38. In this instance, first portion 34 further includes slits 48 positioned proximate middle hanger 18, where slits 48 are dimensioned to receive tabs 30 of middle hanger 18 therethrough.

Middle hanger 18 may also be positioned at alternate positions along reflector 24 between exhaust end 20 and burner end 22, and spaced apart from sliding joint 38. In that case, slits 48 also be correspondingly positioned in first portion 34 or second portion 36 to receive tabs 30 of middle hanger 18 therethrough.

Turning now to FIGS. 7-18, there are illustrated embodiments of system 10 adapted to be secured to structure 200 with a fixed bracket 50 and a free bracket 60.

In that regard, system 10 is further shown to include a first fixed bracket 50a that is securable to structure 200, wherein exhaust hanger 14 is rigidly secured to first fixed bracket 50a. System 10 also includes a first free bracket 60a that is securable to structure 200. First free bracket 60a has a support member 61 orientated parallel to longitudinal axis X of tube heater 100. As shown, burner hanger 16 is slidably coupled to support member 61 of first free bracket 60a. Burner hanger 16 may, thus, slide along support member 61 to allow burner 102 and burner end 22 of canopy 12 to slide relative to structure 200 when radiant tube 104 and reflector 24 thermally expand and contract.

FIGS. 13-18 illustrate different examples of fixed bracket 50 and free bracket 60. FIGS. 13-14 show fixed bracket 50 and free bracket 60 adapted for securing system 10 to a wall of a structure. FIGS. 15-16 show fixed bracket 50 and free bracket 60 adapted for securing system 10 generally parallel to a ceiling of a structure. FIGS. 17-18 show fixed bracket 50 and free bracket 60 adapted for securing system 10 at an angle to a ceiling of a structure. FIGS. 13, 15, and 17 show examples of fixed bracket 50, while FIGS. 14, 16, and 18 show examples of free bracket 60.

Each fixed bracket 50 and free bracket 60 include a mounting portion or flange 52, 62 and a suspending portion or leg 53, 63 extending at an angle from mounting portions 52, 62. The depicted embodiments show suspending portion 53, 63 extending generally perpendicularly from mounting portions 52, 62.

Mounting portions 52, 62 are rigidly securable to a ceiling or a wall of a structure. As shown, mounting portions 52, 62, have apertures 54, 64 through which fasteners may be received to fasten fixed bracket 50 and/or free bracket 60 to a wall or a ceiling of a structure.

Each suspending portion 53, 63 is adapted to be, and is, coupled to one of the hangers, such as exhaust hanger 14, middle hanger 18, or burner hanger 16.

In the depicted embodiments, suspending portion 53 of fixed brackets 50, comprises a plate 55 with two suspending apertures 56 positioned therein, to correspond with the two tabs 30 of hangers 14, 18. The use of two tabs allows tube heater 100 to be hung at an angle to structure 200 if desired. However, if hangers 14, 18 only had one tab 30, suspending portion 53 of fixed bracket 50 may also only correspondingly comprise one suspending aperture 56.

Figure 8:
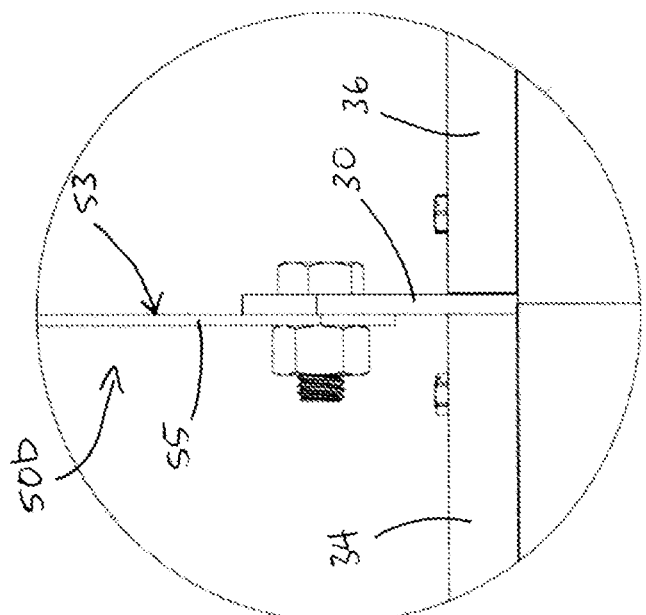
FIG. 8 is an enlarged view of portion C of FIG. 7.

Depending on where and how system 10 is to be secured to structure 200, first fixed bracket 50a may comprise any one of the fixed brackets shown in FIGS. 13, 15, and 17. As best seen in FIG. 8, exhaust hanger 14 is secured to first fixed bracket 50a with a bolt or fastener extending through each of hanger apertures 32 of exhaust hanger 14 and its corresponding suspending aperture 55 of first fixed bracket 50a.

In the depicted embodiments, suspending portion 53 of free brackets 60, comprises a pair of plates 65 arranged in parallel to one another and supports support member 61 there between. Support member 61 is shown to be a pair of shafts 66 extending between plates 65 in parallel to one another and to longitudinal axis X of tube heater 100. Shafts 66 correspond with the two tabs 30 of hanger 16. If hanger 16 only had one tab 30, suspending portion 63 of free bracket 60 may also only correspondingly comprise one shaft 66.

Figure 9:
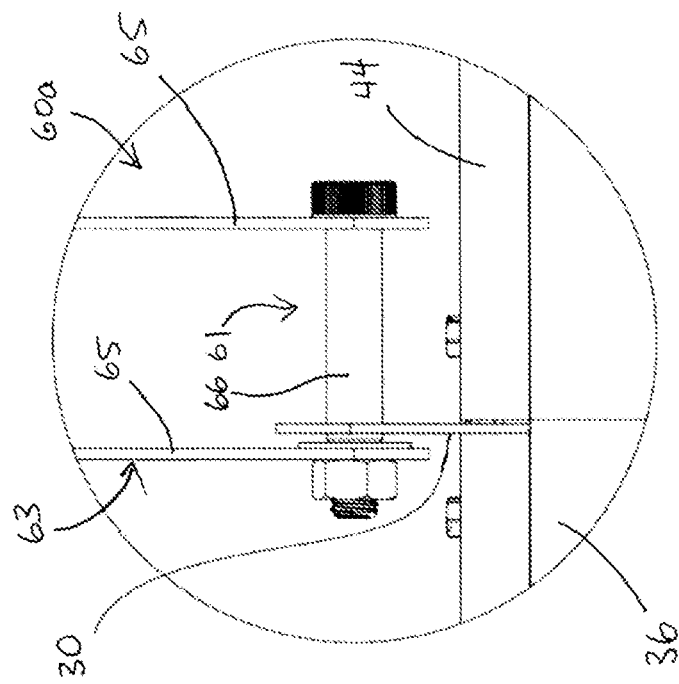
FIG. 9 is an enlarged view of portion D of FIG. 7.

Depending on where and how system 10 is to be secured to structure 200, first free bracket 60a may comprise any one of the free brackets shown in FIGS. 14, 16, and 18. As best seen in FIG. 9, shafts 66 of first free bracket 60a slidably extend through hanger apertures 32 of burner hanger 16, thus allowing burner hanger 16 to slide relative to first free bracket 60a.

In embodiments where system 10 includes middle hanger 18, system 10 may further include a second fixed bracket 50b or a second free bracket 60b for coupling with middle hanger 18. In either case, second fixed bracket 50b or second free bracket 60b is securable to structure 200 between first fixed bracket 50a and first free bracket 60a.

If a second fixed bracket 50b is used, middle hanger 18 may be rigidly secured to second fixed bracket 50b in a similar manner as described above for first fixed bracket 50a and exhaust hanger 14. Similar to first fixed bracket 50a, second fixed bracket 50b also has suspending portion 53 with two suspending apertures 56 that are secured to tabs 30 of middle hanger 18 with a fastener extending through the corresponding suspending apertures 56 and hanger apertures 32. FIG. 7 illustrates an example of system 10 with second fixed bracket 50b secured to middle hanger 18.

Figure 20:
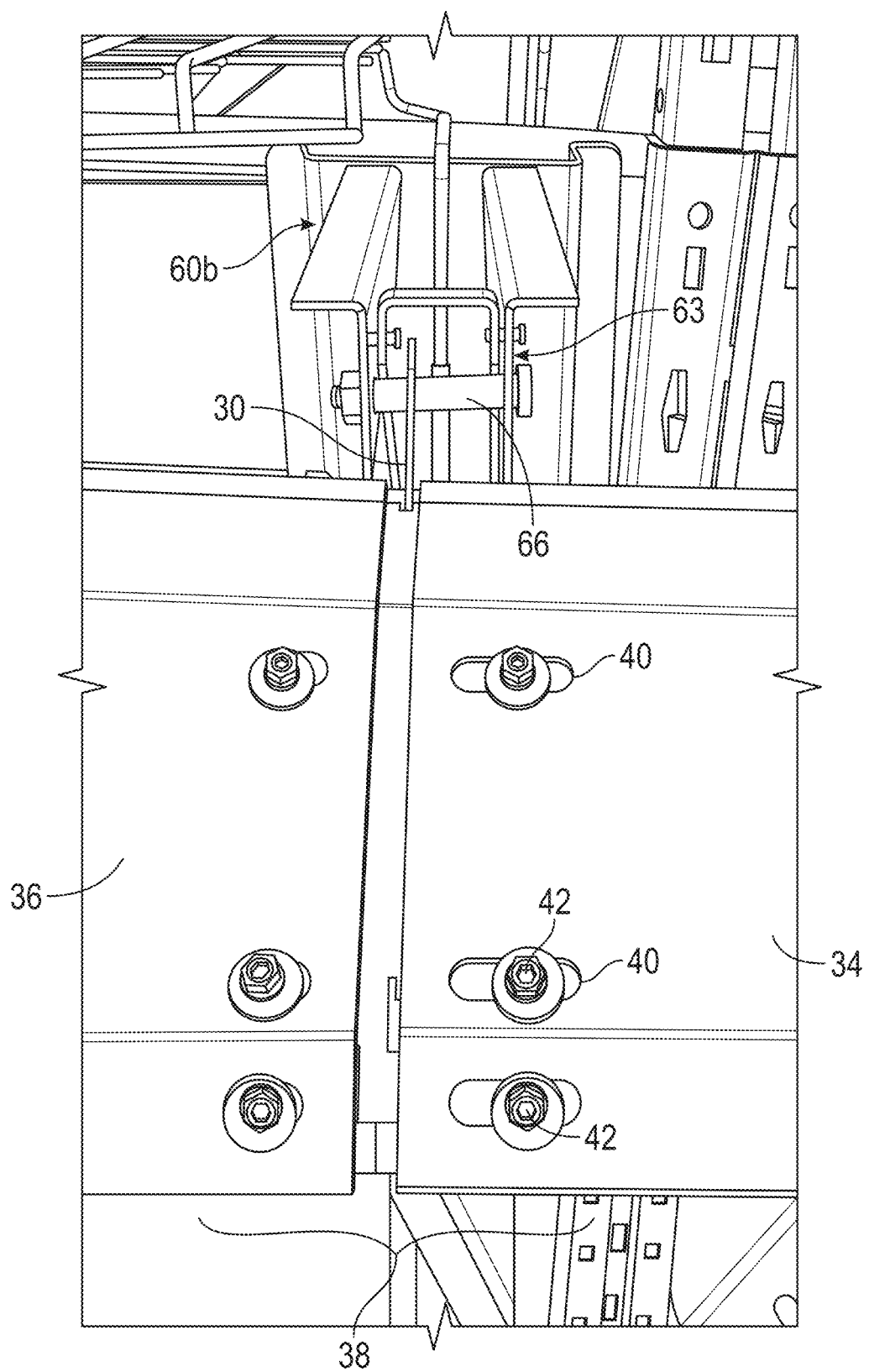
FIG. 20 is an enlarged, front perspective view of portion E of FIG. 19.

If a second free bracket 60b is used, middle hanger 18 may be slidably coupled to second free bracket 60b in a similar manner as described above for first free bracket 60a and burner hanger 16. Similar to first free bracket 60a, second free bracket 60b also has suspending portion 53 with first and second support members 61 (i.e., two parallel shafts 66 which slidably extend through hanger apertures 32 in tabs 30 of middle hanger 18). FIG. 20 illustrates an example of system 10 with second free bracket 60b secured to middle hanger 18.

Figure 19:
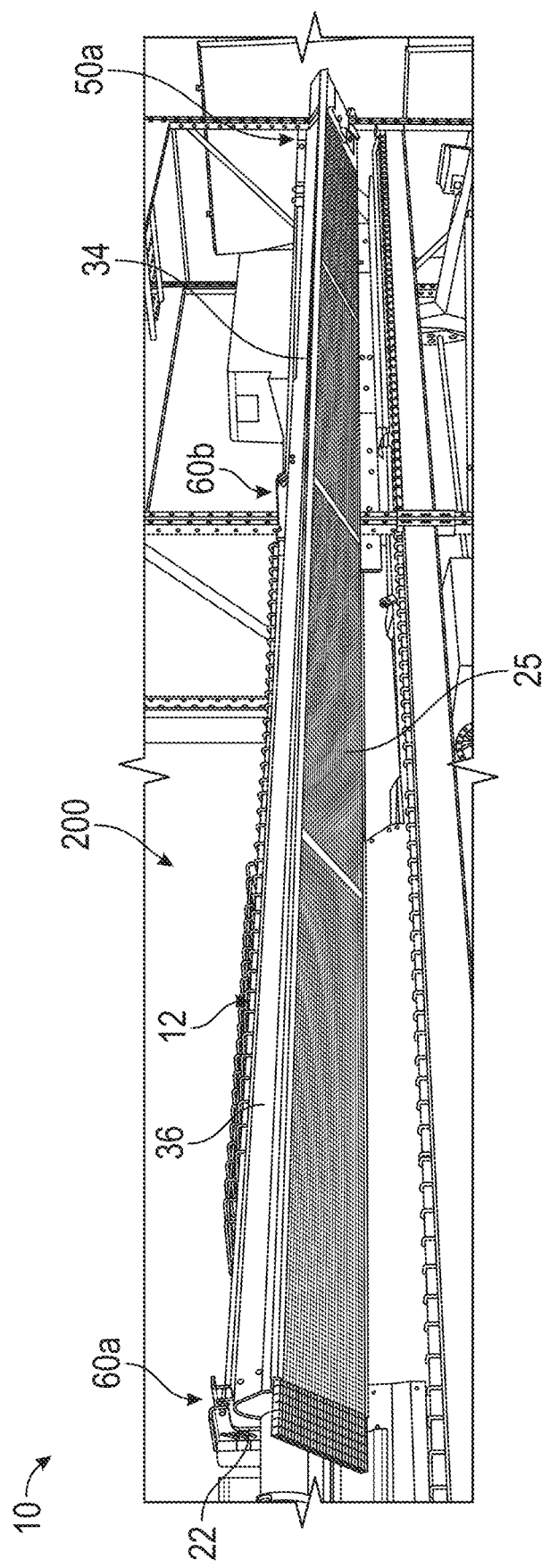
FIG. 19 is a perspective view of the system of FIG. 7 in use.
Figure 21:
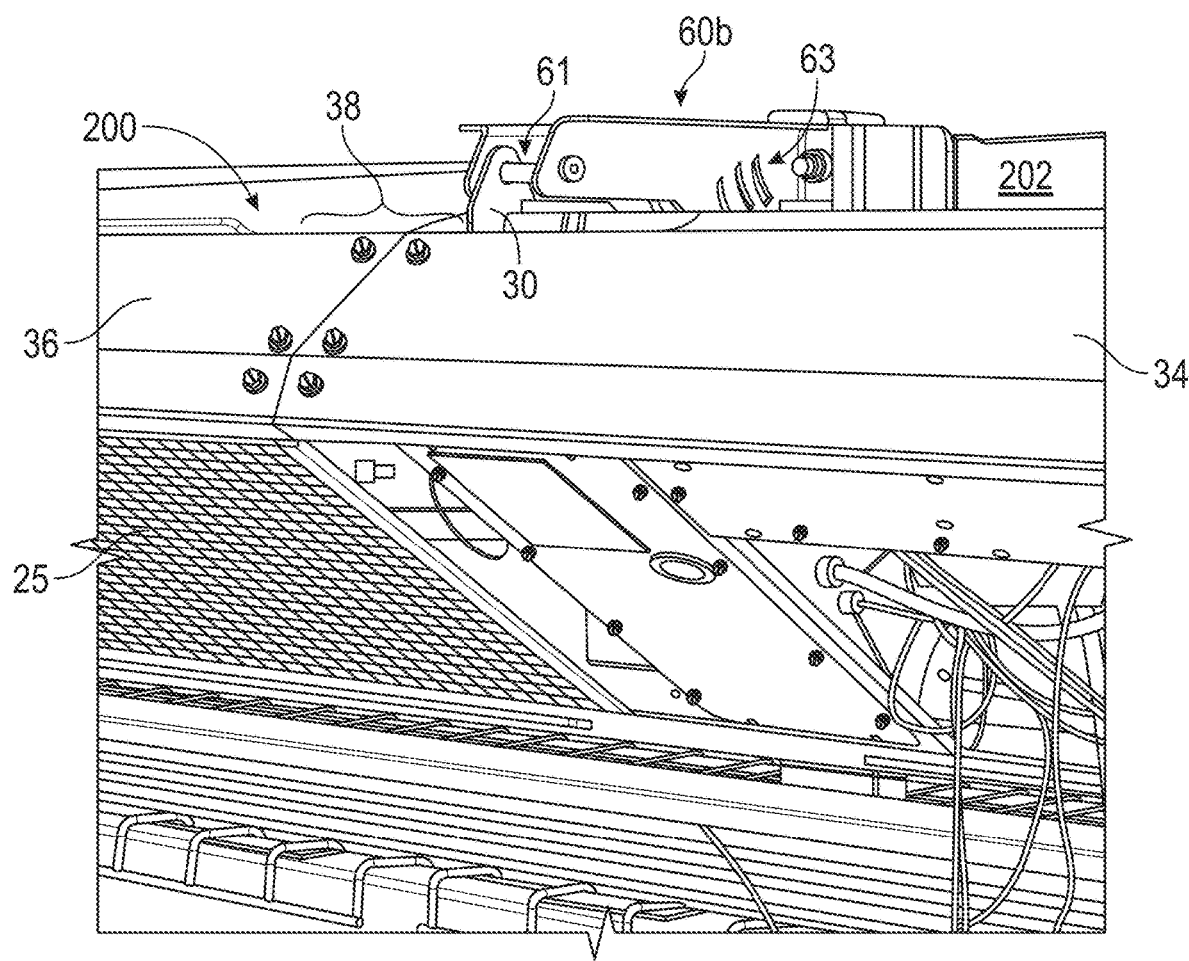
FIG. 21 is an enlarged, lower perspective view of portion F of FIG. 19.

FIGS. 19-21 further illustrate an example where system 10 is secured to a wall 202 of a structure 200 with fixed bracket 50 and free bracket 60 shown in FIGS. 13 and 14.

Figure 22:
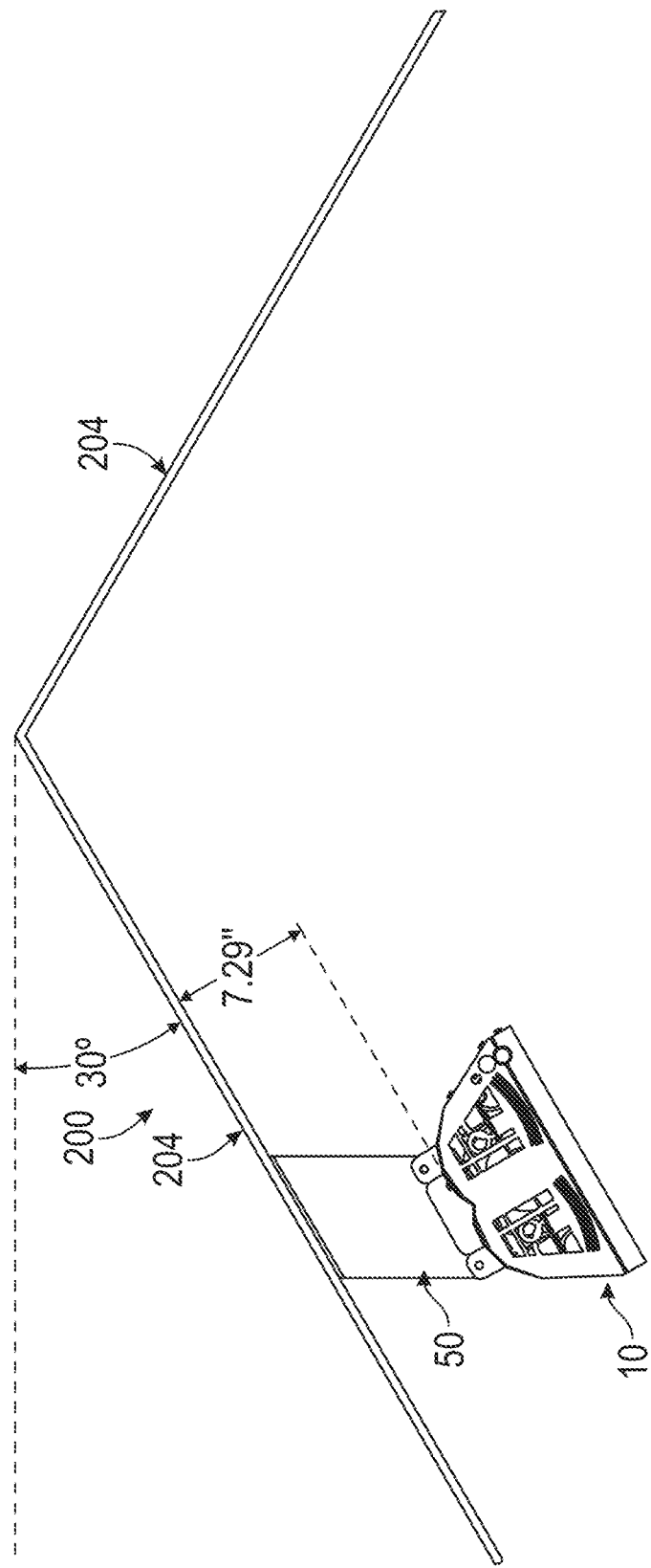
FIG. 22 is a side view of the system of FIG. 7 in use with a structure.
Figure 23:
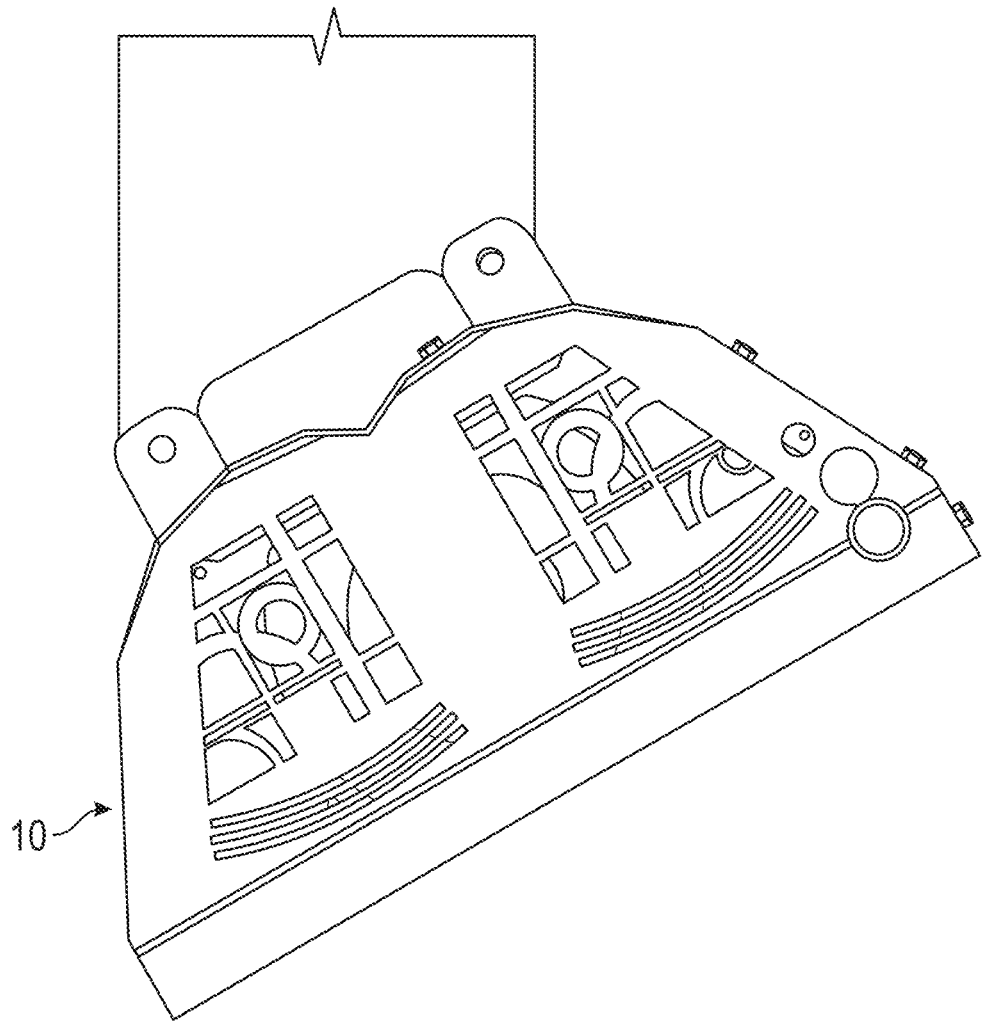
FIG. 23 is an enlarged view of portion F of FIG. 22.

FIGS. 22-23 illustrate an example where system 10 is secured to a sloping ceiling 204 of structure 200 with another version of fixed bracket 50.

Figure 24:
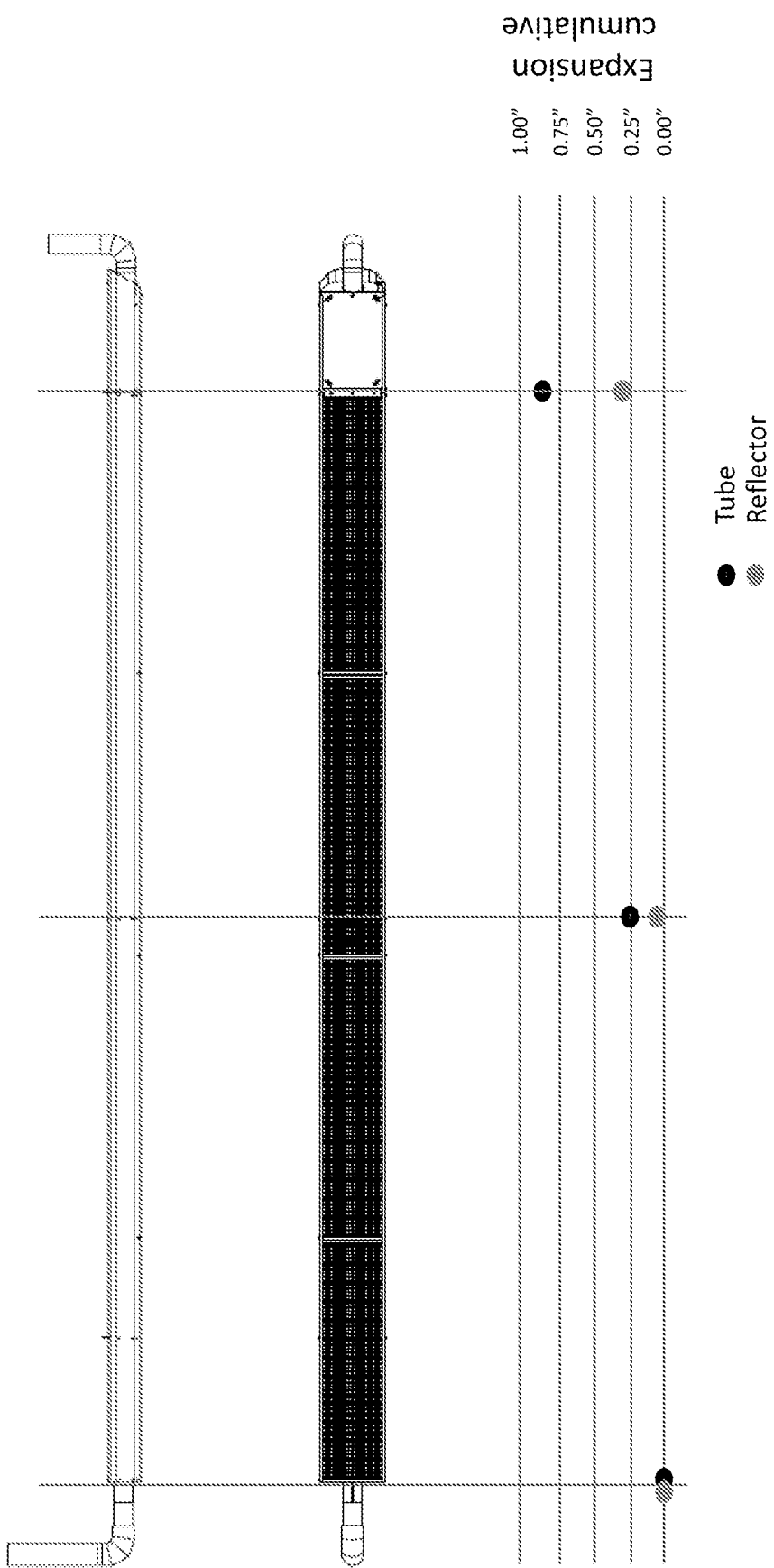
FIG. 24 is a diagram illustrating cumulative between the tube heater and the reflector.

FIG. 24 illustrates cumulative between radiant tube 104 and reflector 24. As described above, exhaust hanger 14 is rigidly fixed to structure 200 by first fixed bracket 50a, with radiant tube 104 and reflector 24 rigidly fixed to exhaust hanger 14. Thus, there is no expansion difference at exhaust end 20. At middle hanger 18, radiant tube 104 has cumulatively expanded slightly more than reflector 24. At burner end 22, radiant tube 104 has cumulatively expanded noticeably more than reflector 24.

To accommodate the varying expansion differences between radiant tube 104 and reflector 24, radiant tube 104 is slidable relative to both middle hanger 18 and reflector 24 at middle hanger 18. Sliding joint 38 is positioned between exhaust end 20 and burner end 22 to allow a segment of reflector 24 to slide relative to middle hanger 18. Burner hanger 16 is slidable relative to structure 200 and, optionally, middle hanger 18 may also be slidable relative to structure 200.

The net result of the above described system is that radiator tube 104 and reflector 24 are allowed to expand and contract from exhaust end 20 towards burner end 22 at differing rates.

Further to the example above, if radiant tube 104 were to expand at a higher rate than reflector 24 such that radiant tube 104 lengthens to a greater degree than reflector 24, burner end 22 can slide away from exhaust end 20 due to burner hanger 16 being slidably coupled to structure 200. Even if reflector 24 has not thermally expanded to the same degree, burner hanger 16 can pull or slide second portion 36 of reflector 24 away from first portion 34 due to sliding joint 38. Moreover, if a second free bracket 60b is used, middle bracket 18 may also slide relative to structure 200. This may assist in accommodating thermal expansion of first portion 34 of reflector 24 away from exhaust end 20.

An advantage of the present invention is that thermal expansion is controlled in a manner so that joints in the exhaust piping are not disturbed. The combination of the various connections between radiant tube 104, reflector 24, hangers 14, 16, 18, together with hangers 14, 16, 18 either being secured to structure 200 or allowed to slide relative to structure 200, and sliding joint 38, allow for radiant tube 104 and reflector 24 to expand at different rates without the buildup of stress within reflector 24 that could cause it to warp, bend or take on a wavy appearance.

The present invention can be particularly advantageous when tube heater 100 is mounted at an angle to the horizon. For example, when tube heater 100 is mounted as shown in FIGS. 22 and 23, such as in a doorway, tube heater 100 may be mounted at approximately 45° to throw heat at an angle as opposed to directly downward. In such cases, the problem of thermal expansion can be even more pronounced, since heat tends to be concentrated on the upper side of the reflector such that the reflector gets hotter because of the convection effect and the rising heat off of the burner. In such cases, the temperature differential between the radiant tube and the reflector can be more significant.

It is to be understood that what has been described are the preferred embodiments of the invention. The scope of the claims should not be limited by the preferred embodiments set forth above, but should be given the broadest interpretation consistent with the description as a whole.

We claim:

1. A system for securing a tube heater with a longitudinal axis to a structure, the tube heater having a burner with a radiant tube extending therefrom to an exhaust outlet, the system comprising:

an elongate canopy coupled to the tube heater and extending along the longitudinal axis, the canopy comprising a reflector extending between the exhaust outlet and the burner and having:
  an exhaust end securable to the tube heater adjacent the exhaust outlet, and
  an opposed burner end securable to the tube heater adjacent to the burner;
an exhaust hanger rigidly coupled to the canopy proximate the exhaust end and configured to be rigidly coupled to the structure, the exhaust hanger rigidly coupled to the exhaust outlet of the tube heater to hang the exhaust outlet and the exhaust end from the structure;
a burner hanger coupled to the canopy proximate the burner end and configured to be slidably coupled to the structure, the burner hanger configured to secure the radiant tube at a position adjacent to the burner, the burner hanger hanging the burner end and the radiant tube that is adjacent to the burner from the structure;

a first fixed bracket securable to the structure, wherein the exhaust hanger is rigidly secured to the first fixed bracket; and a first free bracket securable to the structure, the first free bracket having a support member orientated parallel to the longitudinal axis of the tube heater, wherein the burner hanger is slidably coupled to the support member of the first free bracket, wherein the burner hanger slides along the support member to allow the burner and the burner end of the canopy to slide relative to the structure when undergoing thermal expansion or contraction, and wherein the burner hanger allows the radiant tube adjacent to the burner and the burner end of the canopy to slide relative to the structure, and permits the radiant tube adjacent to the burner to slide relative to the burner end of the canopy, to accommodate independent thermal expansion of the radiant tube and the canopy from the exhaust end toward the burner end and to accommodate independent thermal contraction of the radiant tube and the canopy from the burner end toward the exhaust end.

2. The system of claim 1, wherein the exhaust hanger and the burner hanger each comprises:
shoulders on which the reflector rests;
a tube opening dimensioned to receive the radiant tube therethrough; and
a tab extending from the shoulders with a hanger aperture therein.

3. The system of claim 2, wherein the first fixed bracket and the first free bracket each comprises:
a mounting portion rigidly securable to the structure; and
a suspending portion extending from the mounting portion and coupled to the exhaust hanger and the burner hanger, respectively.

4. The system of claim 3, wherein the suspending portion of the first fixed bracket comprises a suspending aperture, wherein the exhaust hanger is secured to the first fixed bracket with a fastener extending through the hanger aperture of the exhaust hanger and through the suspending aperture of the first fixed bracket.

5. The system of claim 4, wherein the suspending portion of the first free bracket supports the support member, the support member including a shaft orientated parallel to the longitudinal axis of the tube heater, wherein the shaft of the first free bracket slidably extends through the hanger aperture of the burner hanger.

6. The system of claim 5, wherein the reflector of the canopy comprises a first longitudinal portion and a second longitudinal portion slidably secured to the first portion.

7. The system of claim 6, wherein the reflector further includes a sliding joint positioned between the exhaust end and the burner end, slidably coupling the first longitudinal portion to the second longitudinal portion.

8. The system of claim 7, wherein the sliding joint comprises one or more apertures in the second portion, and one or more fasteners extending through the first portion and the respective oblong apertures for linear sliding engagement between the first and second longitudinal portions of the reflector.

9. The system of claim 2, further comprising a middle hanger coupled to the canopy between the burner end and the exhaust end, the middle hanger configured to be coupled to the structure, the middle hanger comprising:
shoulders on which the reflector rests;
a tube opening dimensioned to slidably receive the radiant tube therethrough; and
a tab extending from the shoulders with a hanger aperture therein.

10. The system of claim 9, further comprising:
a second fixed bracket securable to the structure between the first fixed bracket and the first free bracket, wherein the middle hanger is rigidly secured to the second fixed bracket.

11. The system of claim 9, further comprising:
a second free bracket securable to the structure between the first fixed bracket and the first free bracket, the second free bracket having a second support member orientated parallel to the longitudinal axis,
wherein the middle hanger is slidably coupled to the second support member of the second free bracket.

12. The system of claim 9, wherein the first portion of the reflector extends between the exhaust hanger and the middle hanger, and the second portion extends between the middle hanger and the burner hanger.

13. The system of claim 12, wherein the sliding joint of the reflector is positioned proximate the middle hanger.

14. The system of claim 13, wherein the first portion of the reflector further includes a slit positioned proximate the middle hanger, the slit dimensioned to receive the tab of the middle hanger therethrough for coupling with the second free bracket.

15. The system of claim 9, wherein the exhaust hanger, the middle hanger, and the burner hanger each comprises:
a second tab extending from each respective shoulder, with a second hanger aperture therein.

16. The system of claim 15, wherein the suspending portion of the first fixed bracket further comprises a second suspending aperture, wherein the exhaust hanger is further secured to the first fixed bracket with a second fastener extending through the second hanger aperture of the exhaust hanger and the second suspending aperture of the first fixed bracket.

17. The system of claim 16, wherein the support member of the first free bracket further includes a second shaft orientated parallel to the longitudinal axis of the tube heater, and wherein the second shaft of the first free bracket slidably extends through the second hanger aperture of the burner hanger.

* * * * *